US00RE34959E

United States Patent [19]

Potts

[11] E Patent Number: Re. 34,959

[45] Reissued Date of Patent: May 30, 1995

[54] STAIR-CLIMBING EXERCISE APPARATUS

[75] Inventor: Lanny L. Potts, Tulsa, Okla.

[73] Assignee: Stairmaster Sports/Medical Products, Inc., Tulsa, Okla.

[21] Appl. No.: 789,789

[22] Filed: Nov. 8, 1991

Related U.S. Patent Documents

Reissue of:

[64] Patent No.: 4,708,338
Issued: Nov. 24, 1987
Appl. No.: 892,101
Filed: Aug. 4, 1986

U.S. Applications:

[63] Continuation of Ser. No. 411,803, Sep. 25, 1989, abandoned.

[51] Int. Cl.[6] ..... A63B 23/04

[52] U.S. Cl. ..... 482/52; 482/6; 482/900

[58] Field of Search ..... 482/113, 52, 62, 63, 482/53, 1, 2, 4–6, 902

[56] References Cited

U.S. PATENT DOCUMENTS 444,881 1/1891 Gardiner .
629,909 8/1899 McMillan .

(List continued on next page.)

FOREIGN PATENT DOCUMENTS 0051377 12/1982 European Pat. Off. .
1500390 9/1967 France .
45-2825 2/1970 Japan .
45-2826 2/1970 Japan .
45-2827 2/1970 Japan .
45-13917 5/1970 Japan .
13097 8/1903 United Kingdom .
8483 9/1903 United Kingdom .
976558 11/1964 United Kingdom .
1179831 2/1970 United Kingdom .
1299637 12/1972 United Kingdom .

OTHER PUBLICATIONS

Kinetron, "Isokinetic Preambulation Weight Bearing Therapy", The Kinetron, by James Perrine, 1971.
Counsilman, J., "Isokinetic Exercise; A New Concept in Strength Building," *Swimming World*, vol. 10, No. 11, 1969.
Katch, F., *The Research Quarterly*, vol. 45, No. 1, Mar. 1974, pp. 86–91.

*Primary Examiner*—Stephen R. Crow
*Attorney, Agent, or Firm*—Seed and Berry

[57] ABSTRACT

An exercise apparatus that simulates stair-climbing for a user. The apparatus includes a frame having a base, and a plate on the frame perpendicular to the base. A right pedal and a left pedal are on opposite sides of the plate. A drive system assembly on the plate has a right pedal sprocket, a left pedal sprocket, and a drive sprocket, wherein the right sprocket or left sprocket turn the drive sprocket in one direction only and the right and left sprockets are free to overrun in the opposite direction. The right pedal oscillates between an upper position at rest and a lower, rearward position under the weight of the user and drivingly engages the right pedal sprocket. The left pedal, operating independently of the right pedal, oscillates between an upper position at rest and a lower, rearward position under the weight of the user and drivingly engages the left pedal sprocket. A speed increasing transmission has an input and an output. A continuous chain drivingly engages the drive sprocket and the transmission input. A continuous belt engages the transmission output and an alternator which acts as a dynamic brake. A load resistor connected to the alternator is capable of absorbing the electrical energy output of the alternator. An alternator control and monitor is provided.

11 Claims, 6 Drawing Sheets

U.S. PATENT DOCUMENTS

| | | | |
|---|---|---|---|
| 670,006 | 3/1901 | Raymond . | |
| 857,447 | 6/1907 | Cooper . | |
| 3,062,542 | 11/1962 | Evancha . | |
| 3,505,992 | 4/1970 | Jaeger . | |
| 3,511,500 | 4/1967 | Dunn . | |
| 3,529,474 | 9/1970 | Olson . | |
| 3,589,193 | 6/1971 | Thornton . | |
| 3,592,446 | 7/1971 | Parsons . | |
| 3,592,465 | 7/1971 | Fulkerson, Jr. . | |
| 3,628,791 | 12/1971 | Garcia | 272/70 |
| 3,640,530 | 2/1972 | Henson . | |
| 3,701,529 | 10/1972 | Kruthaupt . | |
| 3,704,886 | 12/1972 | Kay et al. | 272/73 |
| 3,705,721 | 12/1972 | Lulay et al. . | |
| 3,707,285 | 12/1972 | Martin . | |
| 3,716,231 | 2/1973 | Martin . | |
| 3,747,924 | 7/1973 | Champoux | 482/52 |
| 3,759,511 | 9/1973 | Zinkin et al. | 272/73 |
| 3,759,512 | 9/1973 | Yount et al. | 272/73 |
| 3,784,194 | 1/1974 | Perrine | 482/113 |
| 3,824,994 | 7/1974 | Soderberg, Sr. | 128/25 R |
| 3,903,613 | 9/1975 | Bisberg . | |
| 3,929,331 | 12/1975 | Beeding . | |
| 3,953,025 | 4/1976 | Mazman . | |
| 3,970,030 | 7/1976 | McFee . | |
| 4,063,726 | 12/1977 | Wilson . | |
| 4,082,267 | 4/1978 | Flavell | 272/129 |
| 4,084,810 | 4/1978 | Forsman | 272/73 |
| 4,111,414 | 9/1978 | Roberts . | |
| 4,112,928 | 9/1978 | Putsch . | |
| 4,184,678 | 1/1980 | Flavell et al. | 482/6 |
| 4,235,437 | 11/1980 | Ruis et al. . | |
| 4,261,562 | 4/1981 | Flavell | 482/6 |
| 4,325,547 | 4/1982 | Cook . | |
| 4,340,218 | 7/1982 | Wilkinson . | |
| 4,341,380 | 7/1982 | Sauder . | |
| 4,358,105 | 11/1982 | Sweeney | 272/129 |
| 4,452,447 | 6/1984 | Lepley et al. . | |
| 4,470,597 | 9/1984 | McFee | 272/128 |
| 4,512,556 | 4/1985 | Bicocchi . | |
| 4,519,603 | 5/1985 | DeCloux | 272/73 |
| 4,555,108 | 11/1985 | Monteiro . | |
| 4,564,001 | 1/1986 | Terauds . | |
| 4,576,539 | 3/1986 | Williams . | |
| 4,600,187 | 7/1986 | Schenker . | |
| 4,645,197 | 2/1987 | McFee . | |
| 4,659,075 | 4/1987 | Wilkinson . | |
| 4,676,501 | 6/1987 | Hoagland . | |
| 4,687,195 | 8/1987 | Potts . | |
| 4,720,093 | 1/1988 | Del Mar | 272/70 |
| 4,846,458 | 7/1989 | Potts . | |
| 4,869,497 | 9/1989 | Stewart et al. | 482/902 |
| 4,919,418 | 4/1990 | Miller | 482/6 |

STAIR-CLIMBING EXERCISE APPARATUS

Matter enclosed in heavy brackets [ ] appears in the original patent but forms no part of this reissue specification; matter printed in italics indicates the additions made by reissue.

*This is a continuation of Reissue application Ser. No. 07/411,803 filed Sep. 25, 1989, now abandoned, which is a Reissue of Ser. No. 06/892,101, now U.S. Pat. No. 4,708,338.*

BACKGROUND OF THE INVENTION

1. Field of the Invention

The present invention relates to an exercise apparatus that simulates stair climbing. More particularly, the present invention relates to an exercise apparatus having independently oscillating pedals wherein the speed may be controlled and monitored by the operator or may be preselected and controlled and monitored by computer control programs.

2. Prior Art

Stair climbing exercisers are generally known in the art. Treadmill exercisers, such as Parsons (U.S. Pat. No. 3,592,466) and Harrison et al. (U.S. Pat. No. 3,497,215) are typical and are necessary much larger and bulkier than the present design which eliminates the treads and risers. Additionally, in the known treadmill designs, the size of the stairs is fixed and cannot be adjusted to accomodate the user.

Likewise, ladder climbing devices are known in the art. Gulland (U.S. Pat. No. 3,381,958) discloses such a device. While ladder climbing does provide exercise for the user, it does not simulate the forward-stepping action found in stair climbing.

Previous attempts at simulating stair-climbing, such as Champoux (U.S. Pat. No. 3,747,924) and McFee (U.S. Pat. No. 3,970,302), feature pedals that reciprocate with each other as a critical element. This symmetrical range of motion is neither necessary nor desirable. By way of example, in a rehabilitation or medical situation, a user, due to injury, may not be capable of equal work on the right and left pedals. The present invention, with its asymmetrical range of motion, allows the user to vary the size of steps between the left and right pedals to accomodate the needs of the user.

Rotary motion pedal exercisers, while known, are not as desirable as stair-climbing for several reasons. Rotary exercisers are normally operated from the sitting position. Additionally, an even force is not required to operate the rotary pedals. The maximum force is required when the pedals are near the vertical position and less force is required as the pedals depart from that point.

It is, therefore, a principal object and purpose of the present invention to provide an exercise apparatus that accurately simulates stair-climbing and is of a lightweight and simple design.

It is a further object and purpose of the present invention to provide an exercise apparatus that simulates stair-climbing wherein the pedals of the exerciser may oscillate independently of each other and wherein the height of the step is chosen by the user.

It is an additional object and purpose of the invention to provide an exercise apparatus that is less stressful on the user's body ligaments than running, aerobic dancing or other aerobic exercises since it eliminates jarring of the body.

It is an additional object and purpose of the present invention to provide an exercise apparatus that may be controlled and monitored by a computer control.

A patentability search was conducted on the present invention and the following U.S. patents were uncovered in the search:

| U.S. Pat. No. | Patentee | Issue Date |
|---|---|---|
| 4,555,108 | Monteiro | November 26, 1985 |
| 3,381,958 | Gulland | May 7, 1968 |
| 4,519,603 | DeCloux | May 28, 1985 |
| 3,592,466 | Parsons | July 13, 1971 |
| 3,765,245 | Hampl | October 16, 1973 |
| 4,416,293 | Anderson et al. | November 22, 1983 |
| 1,854,473 | Laborda | April 19, 1932 |
| 4,112,928 | Putsch | September 12, 1978 |
| 4,512,566 | Bicocchi | April 23, 1985 |
| 4,298,893 | Holmes | November 3, 1981 |
| 3,497,215 | Harrison | February 24, 1970 |
| 3,970,302 | McFee | July 20, 1976 |
| 3,747,924 | Champoux | July 24, 1973 |
| 3,758,112 | Crum et al. | September 11, 1973 |
| 3,511,500 | Dunn | May 12, 1970 |
| 3,582,069 | Flick | June 1, 1971 |
| 3,495,824 | Cuinier | February 17, 1970 |
| 3,587,319 | Andrews | June 28, 1971 |
| 3,529,474 | Olson et al. | September 22, 1970 |
| 3,756,595 | Hague | September 4, 1973 |
| 2,253,996 | Bechman | August 26, 1941 |
| 1,521,487 | Turner | December 30, 1924 |
| 3,628,791 | Garcia | December 21, 1971 |

Monteiro (U.S. Pat. No. 4,555,108) discloses a rotatable drum with extending ears for stairs having a gear drive connected to a hydraulic system. The steps do not operate independently of each other. In Monteiro and in reciprocating pedal systems, it is possible for the user to shift his or her weight from left to right. The user must consciously decide to work at the exercise, as opposed to the present invention wherein an even force is required to operate the independent pedals.

McFee (U.S. Pat. No. 3,970,302), in its alternate embodiment, and Champoux (U.S. Pat. No. 3,747,924) disclose pedal exercisers having pivotally mounted arms connected to pedals. The pedals reciprocate with each other and do not operate independently. McFee and Champoux, thus, suffer from the same problems mentioned in Monteiro. The desired asymmetrical range of motion is also missing. Additionally, dismounting the McFee device would be difficult since moving weight from one pedal will cause the other pedal to quickly fall. As will be appreciated, in the present invention, when the user stops climbing, both pedals slowly drift to the floor.

DeCloux (U.S. Pat. No. 4,519,603) and Putsch (U.S. Pat. No. 4,112,928) are rotary motion pedal devices suffering from the problems previously mentioned of all rotary motion pedal devices. Putsch discloses rotary motion pedals connected to a direct current generator and load control resistance means. DeCloux discloses a brake and release system to give the user a stepping-up effect.

Hampl (U.S. Pat. No. 3,765,245) discloses an alternator having a permanent magnet, as opposed to the electromagnet in the present invention, and having a load resistor. The present invention eliminates the need for the heavy duty transistor required in Hampl as a controllable variable resistance device.

The remaining references are of interest only.

SUMMARY OF THE INVENTION

The present invention relates to a stair-climbing exercise apparatus operated by a user.

A tubular frame for the apparatus includes a pair of spaced tubular members parallel to each other and a base tubular member extending between the spaced members and perpendicular thereto. Tubular members extend upwardly from the spaced members to form a framework for a plate perpendicular to the spaced members. Inclined tubular sections extend upwardly from one of the spaced members and join to form a handrail.

A right pedal and a left pedal on opposite sides of the plate include pads parallel to the floor. A right pedal arm is pivotally mounted at one end to the right pedal and pivotally mounted at the other end of the base tubular member. A left pedal arm is pivotally mounted at one end to the left pedal and pivotally mounted at the other end to the base tubular member.

A right support arm is pivotally attached at one end to the right pedal and pivotally attached at the other end to the plate. A left support arm is pivotally attached at one end to the left pedal and pivotally attached at the other end to the plate. The support arms are parallel to and equal in length to their respective pedal arms.

One end of a right chain is attached to a winglet that extends from the right pedal arm. The chain is made to pass over and drivingly engage the teeth of a right sprocket which is part of a drive system assembly. The right chain is connected at its other end to a right spring by a connector. The spring travels over a guide sheave or pulley wheel rotatably mounted on the plate and terminates at a hanger secured to the plate.

When the user steps on the pedal, the spring will stretch to allow the chain to move over the sprocket and allow the pedal to move toward the floor. When the user's foot is lifted and brought forward, the spring will cause the pedal to return to the upright position.

The operation of the left pedal is similar to the operation of the right pedal. One end of a left chain is attached to a winglet that extends from the left pedal arm. The left chain is made to pass over and drivingly engage the teeth of a left sprocket on the drive system assembly. The left chain is connected at its other end to a left spring by a connector. The spring travels over a guide sheave or pulley wheel rotatably mounted on the plate and terminates at a hanger secured to the plate.

The drive system assembly includes a central shaft having a drive sprocket welded thereto. The left and right pedal sprockets operate in conjunction with clutch bearings surrounding the shaft. When either the right or left sprocket is moved in the drive direction (when either pedal is depressed), its respective clutch bearing positively locks to turn the shaft, which occurs each time either pedal is depressed. When either the right or left sprocket is turned in the opposite direction (when either pedal is returning to position at rest) the sprocket and its respective clutch bearing will overrun so that the shaft will not be turned opposite to the desired direction of movement.

The drive system assembly has a hub secured to the plate with bolts. A snap ring is on the end of the shaft opposite the drive sprocket. A separator series, consisting of a thrust washer, a thrust bearing and a thrust washer, separates the snap ring from the left sprocket, the left sprocket from the hub, the hub from the right sprocket, and the right sprocket from the drive sprocket.

The continuous chain is engaged with the teeth of the drive sprocket and is engaged with the teeth of a transmission sprocket. The transmission sprocket rotates an input shaft of a transmission which acts as a speed increaser. An output shaft extends from the transmission and terminates at a transmission tooth pulley. An alternator, secured to the plate, includes an alternator shaft and an alternator tooth pulley. The transmission tooth pulley and the alternator tooth pulley are connected by a continuous belt. The alternator, which acts as a dynamic brake, is connected to a load resistor. The alternator is controlled and monitored by a computer control panel.

DETAILED DESCRIPTION OF THE PREFERRED EMBODIMENTS

Figure 1:
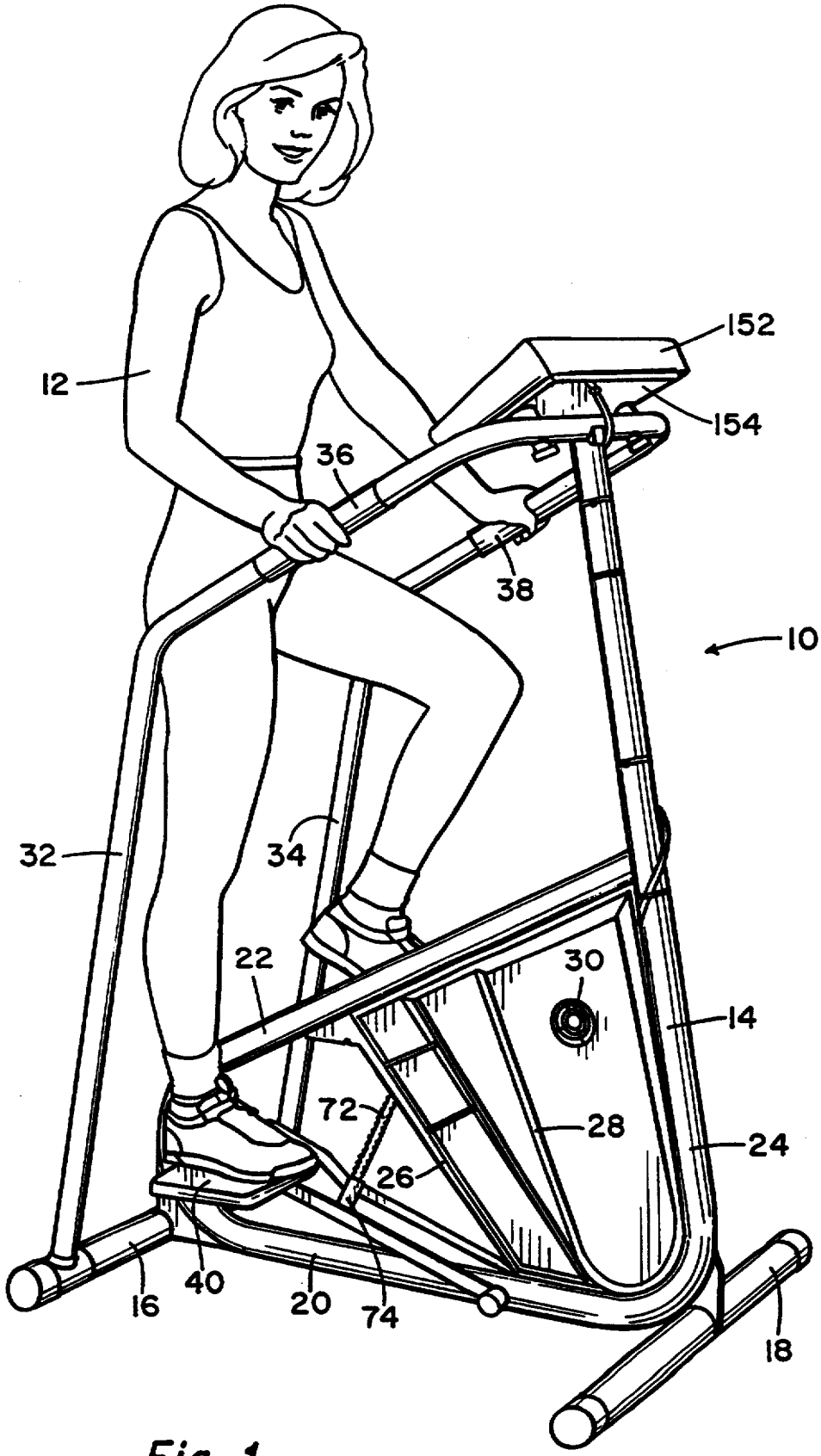
FIG. 1 is a perspective view of an exercise apparatus constructed in accordance with the present invention.

Referring to the drawings in detail, FIG. 1 shows a stair-climbing exercise apparatus 10 operated by an exerciser 12. A tubular frame 14 acts as the supporting structure for the apparatus. The frame 14 includes a pair of spaced tubular members 16 and 18 parallel to each other, which rest on the floor and provide lateral stability for the apparatus. Extending between the spaced members 16 and 18 is a base tubular member 20. Extending upwardly from spaced member 16 is a tubular member 22. Extending upwardly from spaced member 18 is a tubular member 24 which joins member 22 to form the framework for plate 26. Tubular members 20, 22 and 24 may be of a single-piece construction as in the present embodiment. The edges of plate 26 are secured to tubular members 20 and 22. As will be described, many of the various components are mounted on the plate. The central location of the components, between the legs of the user, provides stability to the apparatus and allows for a lightweight and simple design.

The exercise apparatus includes a right cover 28 and a left cover (not shown) to protect and shield from view the components. A vent 30 is provided on the right cover.

Inclined tubular sections 32 and 34 extend upward from member 16 and join to form handrails. Tubular member 24 extends upward to meet inclined tubular sections 32 and 34. The handrails may include grips 36 and 38 for the user.

Figure 2:
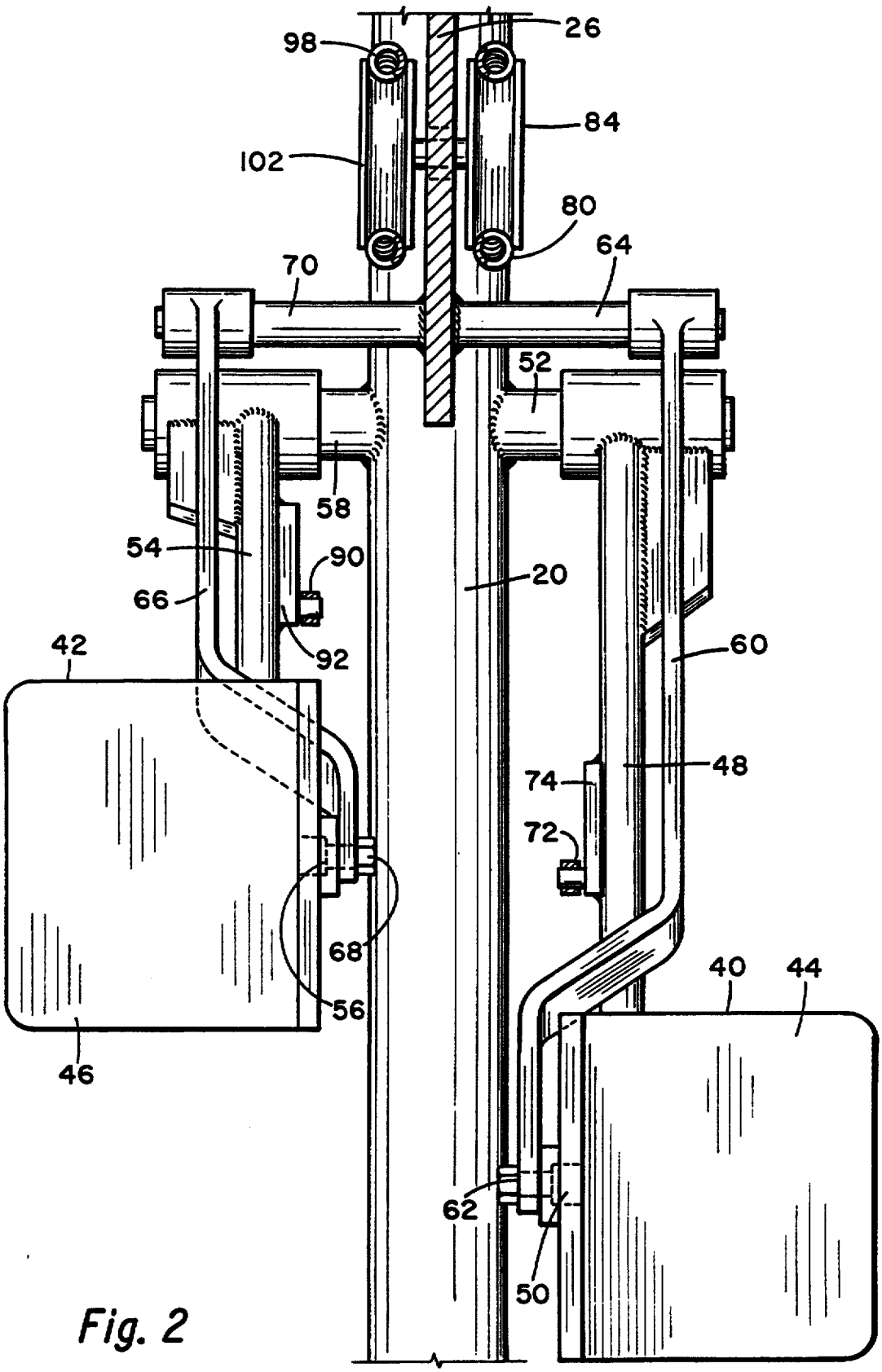
FIG. 2 is a top view, on an enlarged scale, of the pedals of the exercise apparatus shown in FIG. 1.

A right pedal 40 and a left pedal 42 (not shown in FIG. 1) are on opposite sides of the plate 26. The juxtaposition of the pedals is best seen in FIG. 2. The right pedals is shown in the depressed position in FIG. 2 and the left pedal is shown in position at rest. Pedals 40 and 42 include pads 44 and 46, respectively. The pads function as the tread portion of a staircase and are parallel to the floor. A right pedal arm 48 is pivotally mounted to pedal 40 at 50 and is pivotally mounted to base tubular member 20 at shaft 52. A left pedal arm 54 is pivotally mounted to the left pedal 42 at 56 and is pivotally mounted to base tubular member 20 at shaft 58.

A right support arm 60, pivotally attached to the right pedal 40 at 62, is pivotally mounted to the plate at shaft 64. A left support arm 66, pivotally attached to the left pedal 42 at 68, is pivotally mounted to the plate at shaft 70. Support arm 60 is parallel to right pedal arm 48 and support arm 66 is parallel to left pedal arm 54.

The length of the right pedal arm 48 is equal to the length of the right support arm 60. Given that the pedal arm and support arm are parallel and equal to each other, the pad 44 will remain parallel to the floor whether in the depressed position or a test. Similarly, the left pedal arm 54 is parallel and equal to the length of the left support arm 66, and the pad 46 will remain parallel to the floor at all times. This arrangement is advantageous since is produces stable platforms for the user to stand on during the exercise.

Figure 3:
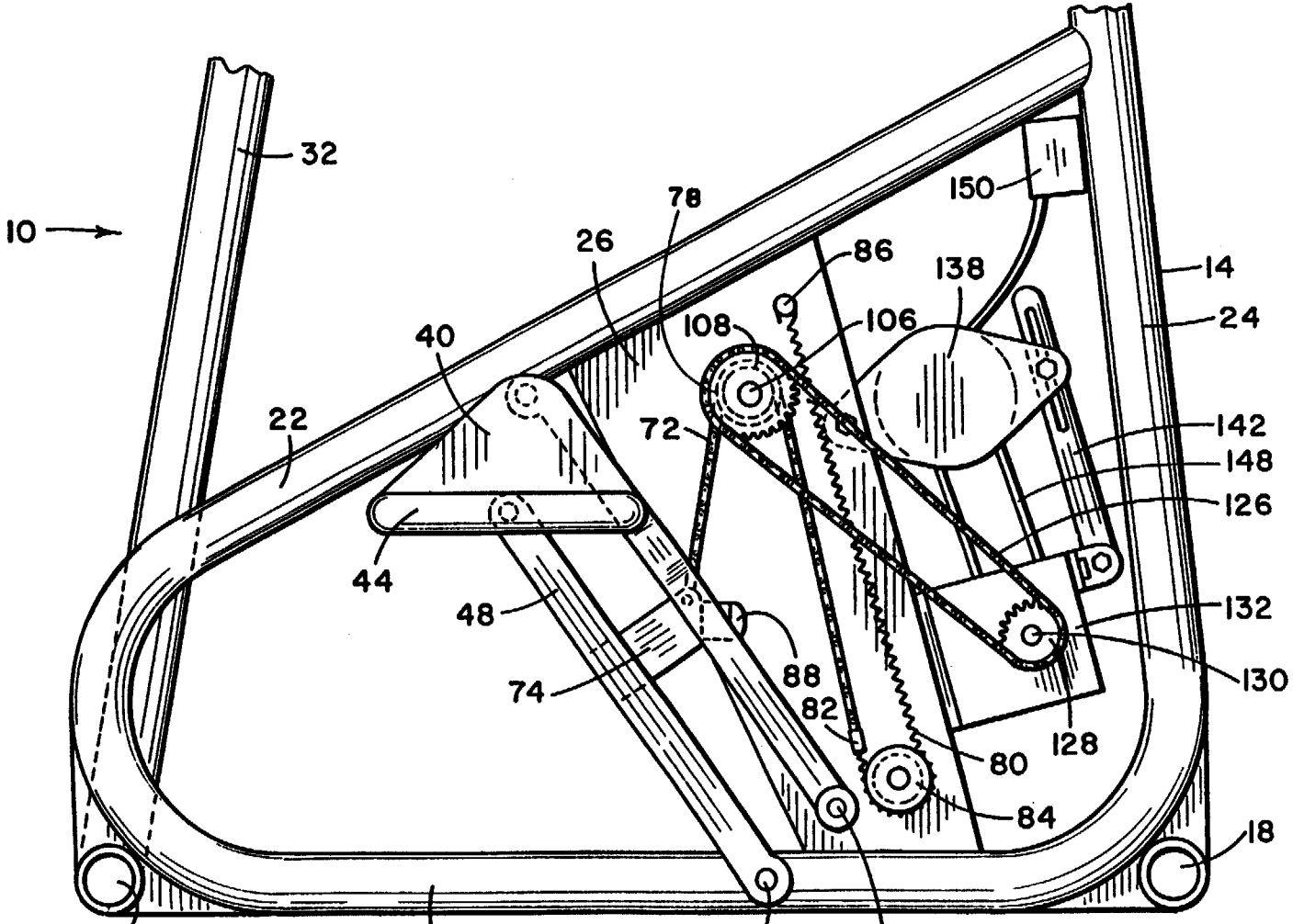
FIG. 3 is a right side elevation view of the present invention shown in FIG. 1, with the right side cover removed.
Figure 4:
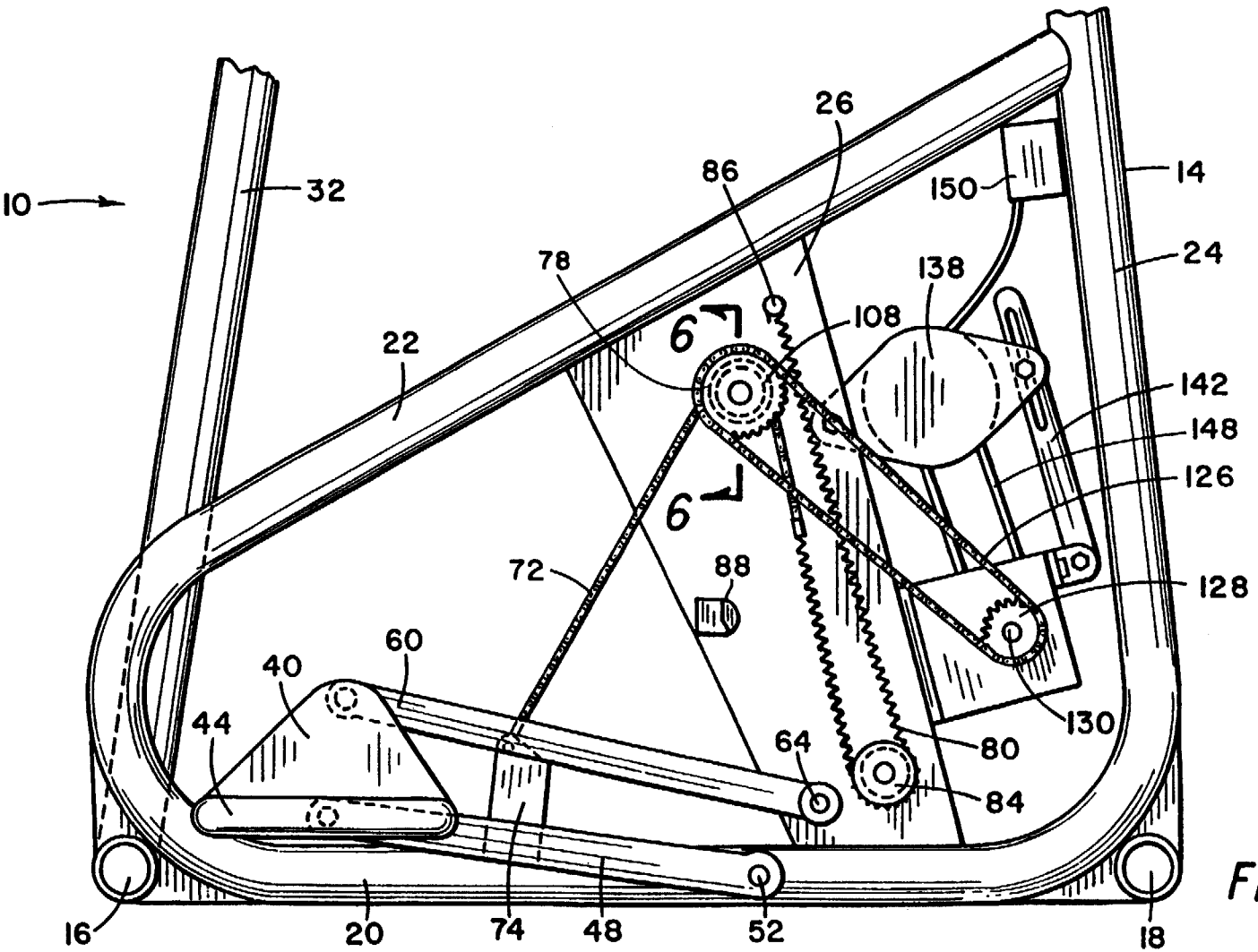
FIG. 4 is a right side elevation view similar to FIG. 3 with the right pedal shown in the depressed position.

FIG. 3 shows the right pedal in position at rest; FIG. 4 shows the right pedal in the depressed position lowered by the weight of the user (not shown). The right pedal moves in an arc where the endpoints of the arc are illustrated in FIGS. 3 and 4. The cover 28 is removed in both FIGS. 3 and 4.

One end of a right chain 72 is attached to a winglet 74 that extends from the right pedal arm 48. The chain 72 is made to pass over and drivingly engage the teeth of a right sprocket 76 which is part of a drive system assembly 78, best seen in cross-section in FIG. 5.

Returning to a consideration of FIGS. 3 and 4, the right chain 72 is connected at its other end to a right spring 80 by a connector 82. The spring travels over a guide sheave or pulley wheel 84 rotatably mounted on the plate and terminates at a hanger 86 secured to the plate 26. The spring 80, attached to the chain 72 and, in turn, attached to the pedal arm 48, is of sufficient tension to keep the pedal in the upright position when not in use. The pedal, pedal arm and support arm will be raised until the winglet 74 rests against a stop 88 welded to the plate 26.

When the user steps on the pedal, the spring will stretch to allow the chain to move over the right sprocket and allow the pedal to move downward and rearward toward the floor. When the user's foot is lifted and brought forward, the spring will cause the pedal to return to the upright position. The weight of the exerciser, thus, activates the pedal.

Figure 5:
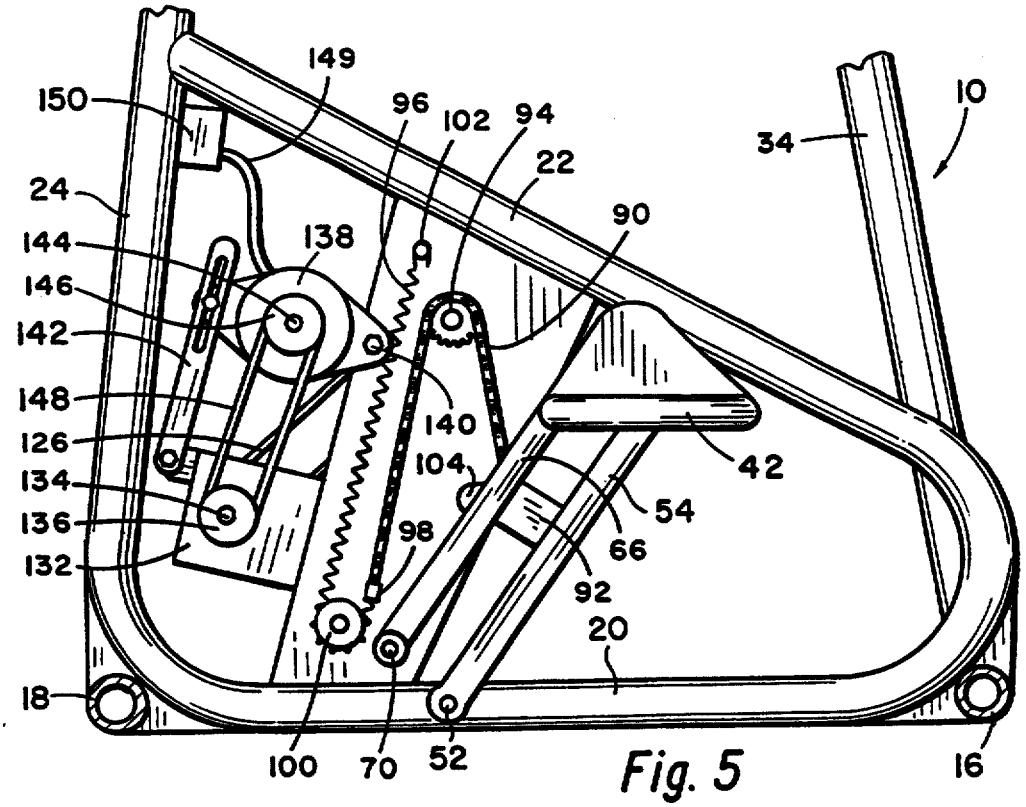
FIG. 5 is a left side elevation view of the invention shown in FIG. 1 with the left cover removed.

As best seen in FIG. 5, the operation of the left pedal 42 is similar to the operation of the right pedal just described. One end of a left chain 90 is attached to a winglet 92 that extends from the left pedal arm 54. The left chain 90 is made to pass over and drivingly engage the teeth of a left sprocket 94 on the drive system assembly 78. The left chain 90 is connected at its other end to a left spring 96 by a connector 98. The spring travels over a guide sheave or pulley wheel 100 rotatably mounted on the plate and terminate at a hanger 102 secured to the plate. The spring 96, attached to the chain 90, and, in turn, attached to the pedal arm 54, is of sufficient tension to keep the pedal in the upright position. The pedal, pedal arm and support arm will be raised until the winglet 92 rests against a stop 104 welded to the plate.

Figure 6:
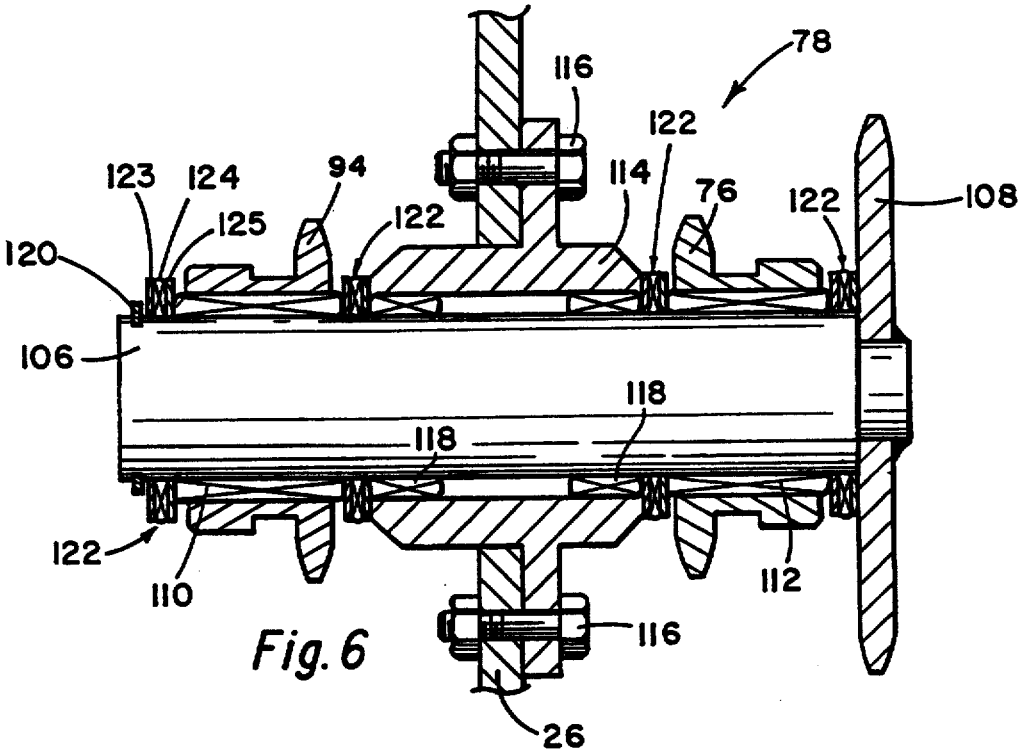
FIG. 6 is a sectional view of the drive system assembly of the present invention taken along section line 6—6 of FIG. 4.

The drive system assembly 78, seen in detail in FIG. 6, includes a central driveshaft 106 having a drive sprocket 108 welded thereto. Surrounding the shaft are the left sprocket 94, and the right sprocket 76. The left and right sprockets operate in conjunction with clutch bearings 110 and 112, respectively. As viewed in FIGS. 3 and 4, when the right sprocket turns counterclockwise, the sprocket 76 and clutch bearing 112 positively lock with the shaft 106 to turn the shaft counterclockwise. This occurs when the right pedal is being depressed. Thus, when the shaft 106 is rotated counterclockwise, the drive sprocket 108 will likewise be rotated counterclockwise. When the right sprocket is turned clockwise (when the right pedal is returning to position at rest), the right sprocket and clutch bearing will overrun so that the shaft 106 and the drive sprocket 108 remain stationary. Thus, torque is transmitted to the shaft and drive sprocket in one direction only.

As viewed in FIG. 5, when the left sprocket 96 is turned clockwise (when the left pedal is being depressed), the sprocket 94 and clutch bearing 110 positively lock with the shaft 106 to rotate it clockwise. When the left sprocket is turned counterclockwise (when the left pedal is returning to position at rest), the left sprocket and clutch bearing will overrun so that the shaft 106 remains in motion in the clockwise direction. Returning to a consideration of FIG. 6, the drive system assembly 78 is secured by a hub 114 to the plate 26 with bolts 116. Pin bearings 118 separate the hub from the shaft. A snap ring 120 is on the end of the shaft opposite the drive sprocket 108. A separator series 122 comprising a thrust washer 123, thrust bearing 124 and thrust washer 125 surrounds the shaft. A separator series 122 separates the snap ring 120 from the left sprocket 94, the left sprocket from the hub 114, the hub from the right sprocket 76, and the right sprocket from the drive sprocket 108.

It is important to note that left and right sprockets 94 and 76 operate independently of each other, resulting in independent operation of the left and right pedals. The asymmetrical range of motion of the pedals is desirable, particularly in rehabilitation and medical applications.

FIGS. 3 and 4 illustrate the drive system assembly operation. When either the left or right pedal is depressed, the driveshaft 106 will be rotated counterclockwise. Continuous chain 126 is engaged with the teeth of the drive sprocket 108 and engaged with the teeth of a transmission sprocket 128.

The transmission sprocket 128 rotates an input shaft 130 of a transmission 132 secured on side to the plate 26. The transmission contains a series of gears (not shown) which act as a speed increaser. As seen in FIG. 5, an output shaft 134 extends from the transmission on the opposite side from the input shaft 130 and terminates in a transmission tooth pulley 136. By way of example and not by way of limitation, the output shaft 134 will rotate at twenty times the speed of the input shaft 130.

An alternator 138 is secured on one side to the plate 26 by means of bolt 140. The alternator is also slidably secured to bar 142. The alternator is of the known variety—being a generator with an electromagnet therein. The alternator includes an alternator shaft 144 and an alternator tooth pulley 146. The transmission wheel 136 and alternator tooth pulley 146 are connected by continuous belt 148. As can be seen from the foregoing, the user provides the energy to operate the alternator 138.

The alternator is connected by leads 149 to a load resistor 150 secured to tubular member 24. The load resistor is capable of absorbing the electrical energy output of the alternator. When the alternator 138 reaches a certain speed, the voltage is transferred to the load resistor. The work of the user is, thus dissipated in the form of heat.

Figure 7:
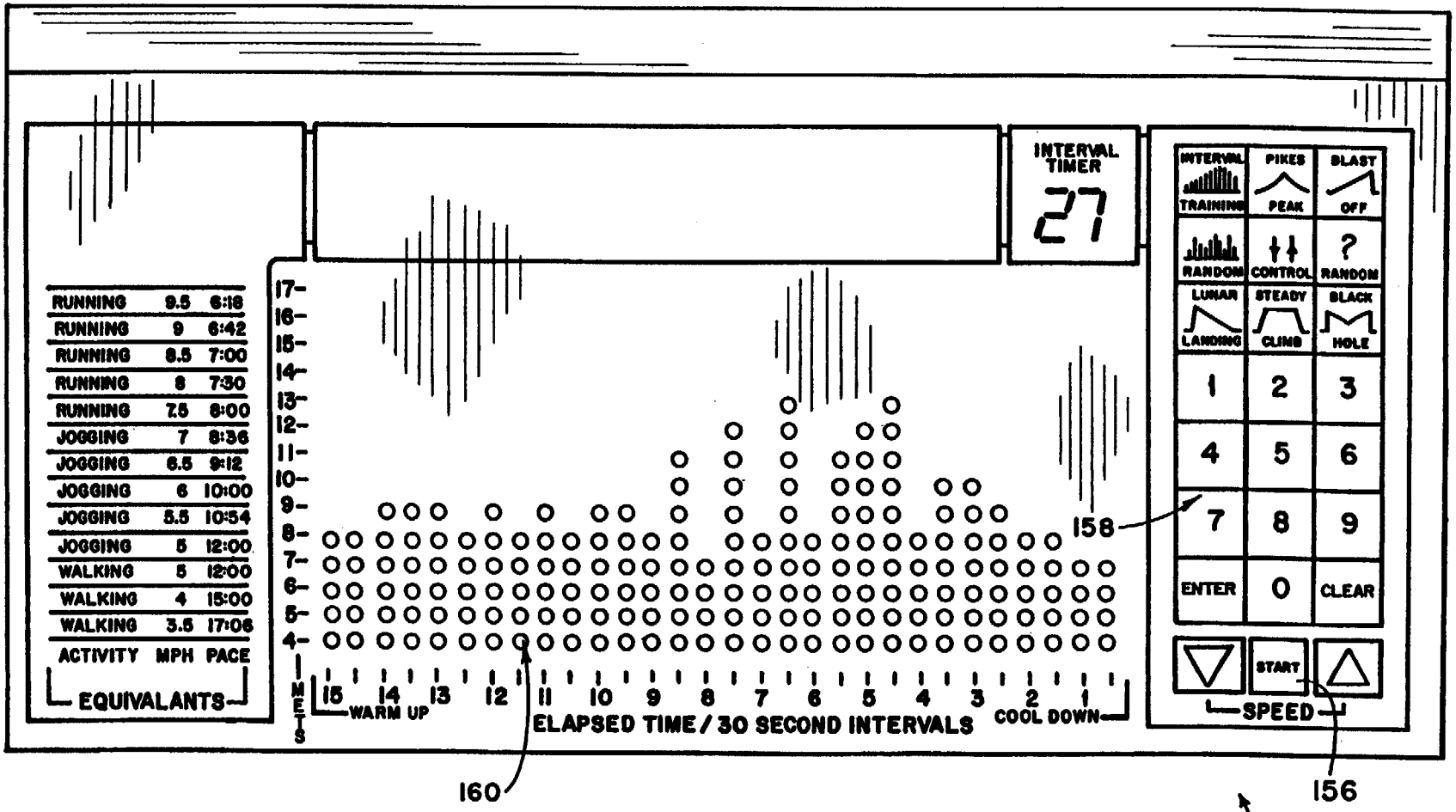
FIG. 7 is a front elevation view of the control panel of the invention shown in FIG. 1.

The alternator is also wired to a computer control panel 152, the face of which is shown in FIG. 7. The computer control panel 152 is positioned for easy viewing by the user. As seen in FIG. 1, the control panel 152 is attached to a console adapter 154 secured to the top of handrails 32 and 34. One of a series of computer programs (not shown) incorporated in the control panel may be selected or the user may set his or her own speed. The computer control panel is powered by household electric service connected to a direct current voltage transformer (not shown).

The computer control panel 152 act to control and monitor the alternator as follows. The wave signal coming off of the alternator 138 at the stator terminal (not shown) is connected to the control panel and used as a tachometer. As long as the alternator speed is less than the predetermined control speed, the work of the user continues to produce increased speed. Up until the alternator reaches the predetermined control speed, only a tiny amount of voltage is produced and there is little resistance to acceleration. When the alternator's speed is greater than the predetermined speed, the voltage generated is directed to the load resistor, thereby dynamically braking the alternator. In actual operation, the alternator is turned on and off several hundred times per second and the net effect is a fluid motion.

In order to operate the exercise apparatus 10, the user will grasp the handrails 32 and 34 and step up onto both pedals 40 and 42. Under the weight of the user, the pedals will move downward and rearward to their lowermost position near the floor. The user will then press the start button 156 on the face of the computer control panel 152. The user will enter his or her weight into the computer by using the keyboard 158. The user will then begin the stair-climbing exercise, adjusting the length of his or her stride to a comfortable one. The work of the user is monitored in mets and displayed on the computer control panel screen 160. One met is 3.5 ml of oxygen per kilogram of body weight of the user per minute.

The user must continue to walk fast enough to stay up with the speed of the machine. The control panel has a timer (not shown) so that if the user stops climbing for a period of time, the computer panel will switch off.

Whereas, the present invention has been described in relation to the drawings attached hereto, it should be understood that other and further modifications, apart from those shown or suggested herein, may be made within the spirit and scope of this invention.

What is claimed is:

1. An exercise apparatus that simulates stair-climbing for a user which comprises:

(a) a frame having a base;

(b) a plate on said frame perpendicular to said base;

(c) a right pedal and a left pedal, said pedals being on opposite sides of said plate;

(d) drive system assembly means mounted on said plate in order to sum reciprocating motion into continuous and fluid rotary motion, said drive system assembly means having a right pedal sprocket, a left pedal sprocket and a drive sprocket, wherein said drive sprocket is driven by either said right sprocket or said left sprocket in one direction only and said right and left sprockets are free to overrun in the opposite direction;

(e) independently operating right pedal means and left pedal means being on opposite sides of said plate, wherein said right pedal means oscillates said right pedal between an upper position at rest and a lower, rearward position under the weight of the user and drivingly engages said right pedal sprocket, and wherein said left pedal means oscillates said left pedal between an upper position at rest and a lower, rearward position under the weight of the user and drivingly engages said left pedal sprocket;

(f) speed increasing transmission means mounted on said plate having an input and an output;

(g) a continuous chain drivingly engaging said drive sprocket and said transmission input;

(h) dynamic brake means mounted on said plate;

(i) a continuous belt engaging said transmission output and said dynamic brake means; and (j) dynamic brake control and monitor means mounted on said plate whereby the speed of said transmission means, said drive system assembly means and said pedal means are controlled and monitored.

2. An exercise apparatus as set forth in claim 1 wherein said independently operating right pedal means and left pedal means comprises:

(a) a right pedal arm and a left pedal arm, said right pedal arm pivotally attached at one end to said right pedal and pivotally attached at the other end thereof to said plate, and said left pedal arm pivotally attached at one end to said left pedal and pivotally attached at the other end thereof to the opposite side of said plate;

(b) a right support arm and a left support arm, said right support arm parallel to said right pedal arm and pivotally attached at one end to said right pedal and pivotally attached at the other end thereof to said plate, and said left support arm parallel to said left pedal arm and pivotally attached at one end to said left pedal and pivotally attached at the other end thereof to said plate;

(c) a right pulley wheel and a left pulley wheel, said pulleys rotatably mounted on opposite sides of said plate;

(d) a right pedal chain and a left pedal chain, said right pedal chain attached at one end to said right support arm and made to engage said right pedal sprocket and said left pedal chain attached at one end to said left support arm and made to engage said left pedal sprocket; and (e) right spring means and left spring means, said right spring means attached at one end to the other end of said right pedal chain and attached at the other end to said plate, and said left spring means attached at one end to the other end of said left pedal chain and attached at the other end to said plate.

3. An exercise apparatus as set forth in claim 2 including a right cover and a left cover for said plate.

4. An exercise apparatus as set forth in claim 1 wherein said dynamic brake means includes alternator means and load resistor means connected to said alternator means and capable of absorbing the electrical energy output of the alternator.

5. An exercise apparatus as set forth in claim 1 wherein said dynamic brake control and monitor means includes a plurality of computer control programs and allows the user to control the speed of the apparatus or allows a selected computer program to control the speed of the apparatus.

6. An exercise apparatus as set forth in claim 1 wherein said base includes a pair of parallel tubular spaced members, a connecting tubular member perpendicular to said spaced members, and said frame includes upwardly extending tubular members extending from said parallel tubular spaced members.

*7. An exercise apparatus that simulates stairclimbing for a user, which comprises:*

*(a) a frame having a base;*

*(b) a right pedal and a left pedal, movable with respect to said frame;*

*(c) drive system assembly means for summing motion into continuous and fluid rotary motion, said drive system assembly means having a right pedal sprocket, a left pedal sprocket, and a drive means, wherein said drive means is driven by either said right sprocket or said left sprocket in one direction only and said right and left sprockets are free to overrun in the opposite direction;*

*(d) independently operating right pedal means and left pedal means, wherein said right pedal means oscillates said right pedal to provide motion of said right pedal which is a reciprocating motion, with respect to said base, between an upper position at rest and a lower, rearward position under the weight of the user, and drivingly engages said right pedal sprocket, and wherein said left pedal means oscillates said left pedal to provide motion of said left pedal which is a reciprocating motion, with respect to said base, between an upper position at rest and a lower, rearward position under the weight of the user, and drivingly engages said left pedal sprocket;*

(e) speed increasing transmission means having an input and an output;

*(f) means for engaging said drive means and said transmission means input;*

*(g) dynamic brake means for dissipating work of the user in the form of heat;*

*(h) means for engaging said transmission output and said dynamic brake means;*

*(i) means for controlling and monitoring the speed of said pedal means;*

*wherein said independently operating right pedal means and left pedal means comprises:*

*(j) a right pedal arm and a left pedal arm, said right pedal arm pivotally attached at one end to said right pedal, and said left pedal arm pivotally attached at one end to said left pedal;*

*(k) a right support arm and a left support arm, said right support arm parallel to said right pedal arm and pivotally attached at one end to said right pedal, and said left support arm parallel to said left pedal arm and pivotally attached at one end to said left pedal;*

*(l) a right pulley wheel and a left pulley wheel, said right pulley wheel and left pulley wheel rotatably mounted with respect to said frame;*

*(m) a right pedal chain and a left pedal chain, said right pedal chain attached at one end to said right support arm and made to engage said right pedal sprocket and said left pedal chain attached at one end to said left support arm and made to engage said left pedal sprocket; and*

*(n) right spring means and left spring means, said right spring means attached at one end to the other end of said right pedal chain, the other end of said right spring means being attached in a fixed position with respect to said frame and said left spring means attached at one end to the other end of said left pedal chain, the other end of said left spring means being attached in a fixed position with respect to said frame.*

*8. An exercise apparatus as set forth in claim 7, including a right cover and a left cover, coupled to said frame, for protecting components of said apparatus.*

*9. An exercise apparatus that simulates stairclimbing exercise for a user, which comprises:*

*a frame;*

*a right pedal and a left pedal for the user to stand on during exercise;*

*a right arm pivotally coupled to the frame at a right pivot location and having said right pedal attached to said right arm at a location spaced apart from said right pivot location to permit downward movement of said right pedal about said right pivot location along an arcuate path from an upper position to a lower position under the weight of the user;*

*a left arm pivotally coupled to the frame at a left pivot location and having said left pedal attached to said left arm at a location spaced apart from said left pivot location to permit downward movement of said left pedal about said left pivot location along an arcuate path from an upper position to a lower position under the weight of the user;*

*said right arm and said left arm being pivotable independent of each other;*

*a drive system assembly having a summing rotary member with a right side one way clutch mounted thereon and a right elongated flexible member coupled to said rotary member through said right side one way clutch, to transmit rotary movement to said rotary member is one direction in response to downward movement of said right pedal, said right elongated flexible member being connected to said right arm at an attachment location located away from said right pivot location toward said right pedal, the angle between a right arm line extending from said right pivot location through said right pedal attachment location and a straight line segment of said right elongated flexible member extending from said right, side one way clutch toward said right arm, measured on a side of said right elongated flexible member away from said right pivot location, being less than* 90 degrees when said right pedal is in said upper position, and being greater than 90 degrees when said right pedal is in said lower position;

*said drive system assembly further having a left side one way clutch mounted on said rotary member and a left elongated flexible member coupled to said rotary member through said left side one way clutch, to transmit rotary, movement to said rotary member in said one direction in response to downward movement of said left pedal, said left elongated flexible member being connected to said left arm at an attachment location located away from said left pivot location toward said left pedal, the angle between a left arm line extending from said left pivot location through said left pedal attachment location and a straight line segment of said left elongated flexible member extending from said left side one way clutch toward said left arm, measured on a side of said left elongated flexible member away from said left pivot location,*

*being less than 90 degrees when said left pedal is in said upper position, and being greater than 90 degrees when said left pedal is in said lower position; and*

*a brake coupled to said rotary member and controlling the velocity of said rotary member.*

*10. The exercise apparatus of claim 9 further including:*

*a control drive for selecting a predetermined control speed; and*

*wherein said brake controls the velocity of said rotary member to said predetermined control speed.*

*11. An exercise apparatus that simulates stairclimbing for a user, which comprises:*

*(a) a frame having a base;*

*(b) a right pedal and a left pedal, movable with respect to said frame;*

*(c) a drive system assembly summing motion into continuous and fluid rotary motion, said drive system assembly having a right one way clutch, a left one way clutch, and a drive means, wherein said drive means is driven by either said right one way clutch or said left one way clutch in one direction only and said right and left one way clutches are free to overrun in the opposite direction;*

*(d) independently operating right pedal means and left pedal means, wherein said right pedal means oscillates said right pedal to provide motion of said right pedal which is a reciprocating motion, with respect to said base, between an upper position and a lower, rearward position under the weight of the user, and drivingly engages said right one way clutch, and wherein said left pedal means oscillates said left pedal to provide motion of said left pedal which is a reciprocating motion, with respect to said base, between an upper position and a lower, rearward position under the weight of the user, and drivingly engages said left one way clutch;*

*(e) a speed increasing transmission having an input and an output, said transmission input being engaged with said drive means;*

*(f) a brake dissipating the work of the user in the form of heat, said brake being engaged with the transmission output;*

*(g) a controller controlling and monitoring the speed of said drive means;*

*wherein said independently operating right pedal means and left pedal means comprises:*

*(h) a right pedal arm and a left pedal arm, said right pedal arm pivotally attached at one end to said right pedal, and said left pedal arm pivotally attached at one end to said left pedal;*

(i) a right support arm and a left support arm, said right support arm adjacent to said right pedal arm and pivotally attached at one end to said right pedal, and said left support arm adjacent to said left pedal arm and pivotally attached at one end to said left pedal;

(j) a right elongated flexible member and a left elongated flexible member, said right elongated flexible member attached at one end to said right pedal arm and made to engage said right one way clutch and said left elongated flexible member attached at one end to said left pedal arm and made to engage said left one way clutch; and

*(k) right spring means and left spring means, said right spring means attached at one end to the other end of said right elongated flexible member, said right spring means being operatively engaged with said frame and said left spring means attached at one end to the other end of said left elongated flexible member, said left spring means being operatively engaged with said frame.*

* * * * *

UNITED STATES PATENT AND TRADEMARK OFFICE

CERTIFICATE OF CORRECTION

PATENT NO. : Re. 34,959
DATED : May 30, 1995
INVENTOR(S) : Lanny L. Potts

It is certified that error appears in the above-identified patent and that said Letters Patent is hereby corrected as shown below:

In column 9, claim 7, line 48, please delete "pedal" and substitute therefor --drive--.

In column 10, claim 9, line 37, please delete "is" and substitute therefor --in--.

In column 10, claim 9, line 46, please delete ",".

In column 10, claim 9, line 57, please delete ",".

In column 11, claim 10, line 7, please delete "drive" and substitute therefor --device--.

Signed and Sealed this

Sixth Day of October, 1998

*Attest:*

Bruce Lehman

BRUCE LEHMAN

*Attesting Officer*

*Commissioner of Patents and Trademarks*